(12) United States Patent
Armstrong

(10) Patent No.: US 10,187,961 B2
(45) Date of Patent: Jan. 22, 2019

(54) COMBINATION LIGHT, RFID AND SOFTWARE RADIO ASSEMBLY TO REPLACE STANDARD OR EXISTING LIGHTING WITH RFID ENABLED LIGHTING

(71) Applicant: John T. Armstrong, Cypress, CA (US)

(72) Inventor: John T. Armstrong, Cypress, CA (US)

( * ) Notice: Subject to any disclaimer, the term of this patent is extended or adjusted under 35 U.S.C. 154(b) by 0 days.

(21) Appl. No.: 15/565,865

(22) PCT Filed: Apr. 20, 2016

(86) PCT No.: PCT/US2016/028479
§ 371 (c)(1),
(2) Date: Oct. 11, 2017

(87) PCT Pub. No.: WO2016/172236
PCT Pub. Date: Oct. 27, 2016

(65) Prior Publication Data
US 2018/0098409 A1    Apr. 5, 2018

Related U.S. Application Data

(60) Provisional application No. 62/178,837, filed on Apr. 20, 2015.

(51) Int. Cl.
| | | |
|---|---|---|
| H04Q 5/22 | (2006.01) |
| H05B 37/02 | (2006.01) |
| G06K 7/10 | (2006.01) |
| H04L 29/08 | (2006.01) |
| H02J 50/23 | (2016.01) |
| F21V 33/00 | (2006.01) |
| F21K 9/23 | (2016.01) |

(52) U.S. Cl.
CPC ..... *H05B 37/0272* (2013.01); *G06K 7/10316* (2013.01); *G06K 7/10366* (2013.01); *G06K 7/10475* (2013.01); *H02J 50/23* (2016.02); *H04L 67/12* (2013.01); *F21K 9/23* (2016.08); *F21V 33/00* (2013.01)

(58) Field of Classification Search
CPC . H05B 37/0272; H02J 50/23; G06K 7/10316; G06K 7/10366; H04L 67/12; F21K 9/23; F21V 33/00
See application file for complete search history.

(56) References Cited

U.S. PATENT DOCUMENTS

| | | | | |
|---|---|---|---|---|
| 9,672,396 B1* | 6/2017 | Bookman | .......... | G06K 7/10366 |
| 2004/0160323 A1* | 8/2004 | Stilp | .......... | G08B 3/1083 |
| | | | | 340/572.1 |
| 2006/0056855 A1* | 3/2006 | Nakagawa | ............ | G09F 9/33 |
| | | | | 398/183 |

(Continued)

*Primary Examiner* — Quang Pham
(74) *Attorney, Agent, or Firm* — Pasadena Legal Group; Norman R. Van Treeck

(57) ABSTRACT

An RFID reader (500) with a software radio that is aesthetically pleasing and powered using existing electrical systems comprising a component housing (102), a microprocessor (106), a communications protocol IC (108), an RFID interrogator integrated circuit (112), a power source (104), a light source (908), a heat removal means (114) and one or more than one antenna (110) connected to the microprocessor for communicating RDIF data and control data over a non-standard protocol.

29 Claims, 6 Drawing Sheets

(56) References Cited

U.S. PATENT DOCUMENTS

| | | | | |
|---|---|---|---|---|
| 2007/0044092 | A1* | 2/2007 | Banerjee | G06Q 10/08 717/176 |
| 2007/0096919 | A1* | 5/2007 | Knadle, Jr. | B66F 9/0755 340/572.8 |
| 2007/0253468 | A1* | 11/2007 | Pettersen | H04B 1/0483 375/146 |
| 2008/0180935 | A1* | 7/2008 | Burdeen | H05B 37/0272 362/20 |
| 2009/0196016 | A1* | 8/2009 | Massara | F21V 23/0471 362/86 |
| 2010/0141153 | A1* | 6/2010 | Recker | H05B 33/0803 315/149 |
| 2010/0296285 | A1* | 11/2010 | Chemel | F21S 2/005 362/235 |
| 2011/0121654 | A1* | 5/2011 | Recker | H02J 9/065 307/66 |
| 2012/0056720 | A1* | 3/2012 | Barvick | G06K 7/10366 340/10.1 |
| 2012/0075101 | A1* | 3/2012 | Austin | G01P 13/00 340/572.1 |
| 2012/0099336 | A1* | 4/2012 | Lynam | B60Q 1/2665 362/494 |
| 2012/0235579 | A1* | 9/2012 | Chemel | F21S 2/005 315/152 |
| 2012/0306621 | A1* | 12/2012 | Muthu | H05B 37/0272 340/8.1 |
| 2013/0113669 | A1* | 5/2013 | Bellows | H01Q 1/2216 343/764 |
| 2013/0193847 | A1* | 8/2013 | Recker | H05B 33/0803 315/86 |
| 2015/0264779 | A1* | 9/2015 | Olsen | F21S 8/026 315/294 |
| 2016/0092704 | A1* | 3/2016 | Russell | F21V 23/0471 340/10.3 |

* cited by examiner

COMBINATION LIGHT, RFID AND SOFTWARE RADIO ASSEMBLY TO REPLACE STANDARD OR EXISTING LIGHTING WITH RFID ENABLED LIGHTING

CROSS-REFERENCE TO RELATED APPLICATIONS

The present Application is a national stage of International Patent Application No. PCT/US16/28479, titled "A COMBINATION LIGHT, RFID AND SOFTWARE RADIO ASSEMBLY TO REPLACE STANDARD OR EXISTING LIGHTING WITH RFID ENABLED LIGHTING," filed 20 Apr. 2016, the contents of which are incorporated in this disclosure by reference in their entirety.

FIELD OF THE INVENTION

The present invention relates generally to RFID readers, and more particularly to an RFID reader with a software radio that is aesthetically pleasing and powered using existing electrical systems.

BACKGROUND

Currently, fixed RFID infrastructure is used to read the tagged merchandise in a retail or industrial environment. Disadvantageously, this requires the use of a large number of RFID antennas to create uniform RF illumination on all the tags in the monitored area. Additionally, this type of RFID infrastructure is interconnected with RF cables and Multiplexers, all of which exhibit RF loss, and which carry additional costs that are onerous to small and large companies alike. Moreover, owners must pay the facilities to install this type of infrastructure, that is not movable if locations are changed. Nor are these systems easily upgradable. There does exist some integrated reader antennas that operate directly from, and receive power, from the Ethernet utilizing Power over Ethernet (PoE) modules. These units can eliminate some of the cost for installing the RF cables and reduced the facilities charge, these POE units still required a large number of Ethernet cable drops and associated power installation. Data bandwidth on the networks is also high, since in a store of only 10,000 items the tags read in a few seconds can number over million. This high data rate requires the use of data concentrators (aggregators) located on PoE switches that reduce the data rate before connecting to a wireless network. In principal, it is easier to continue a wired network from the aggregators back to the data server, since otherwise, the RFID system can overload the 802.11 network and impact other store operations.

Therefore, there is a need for an RFID reader with a software radio that is aesthetically pleasing and powered using existing electrical systems.

BRIEF DESCRIPTION OF THE DRAWINGS

These and other features, aspects and advantages of the present invention will become better understood with regard to the following description, appended claims, and accompanying figures where:

SUMMARY

Figure 1:
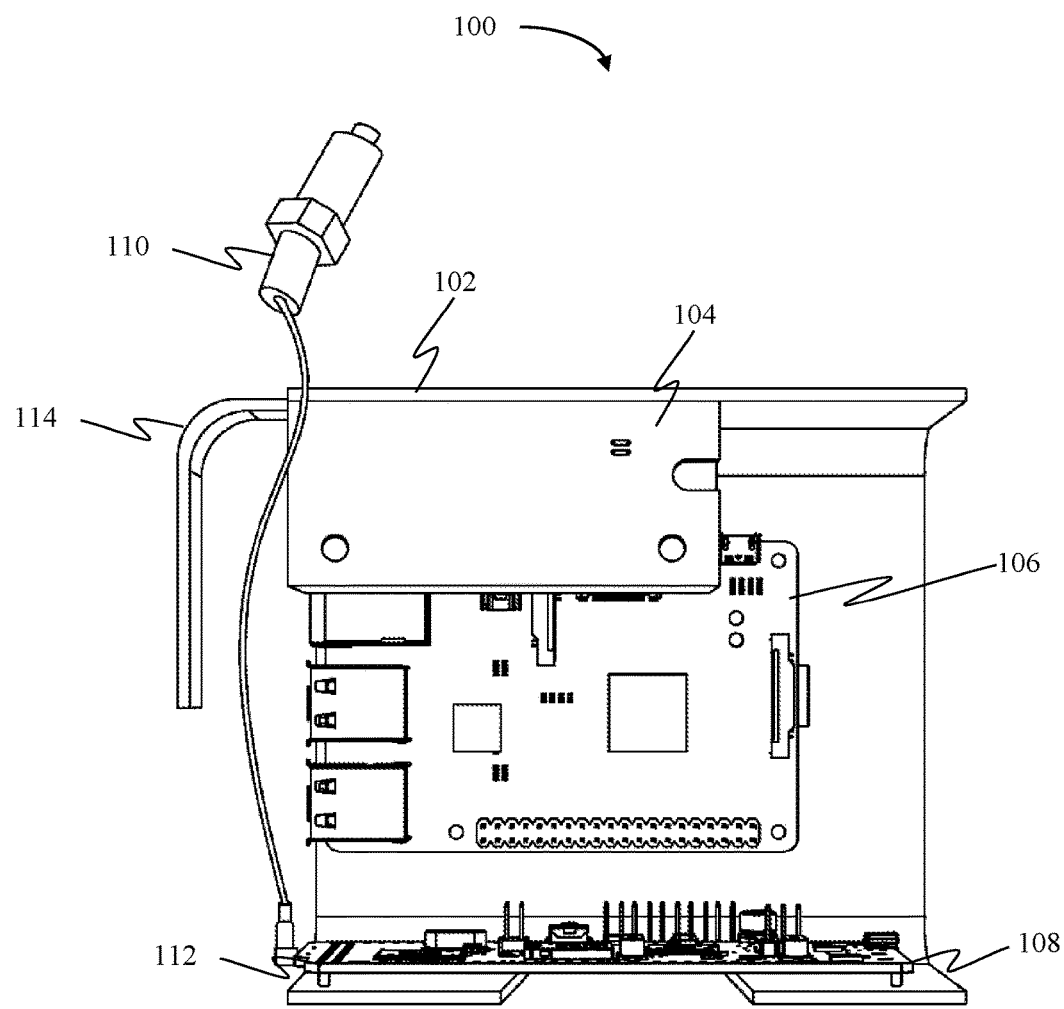
FIG. 1 is a diagram of internal components for an RFID reader with a software radio that is aesthetically pleasing and powered using existing electrical systems, according to one embodiment.

The invention described herein solves the problems in the current art by providing an RFID reader with a software radio that is aesthetically pleasing and powered using existing electrical systems. The reader comprises a component housing, a microprocessor, a communications protocol IC using a non-standard communications protocol, an RFID interrogator integrated circuit, a power source, a light source, a heat removal means and one or more than one antenna for transmitting and receiving RFID data and control data. The RFID reader can relay signals received from other RFID readers.

The RFID reader also has a light bulb housing, a light source, a standard lightbulb power connector connected to the power source, one or more than one RF antenna and an omnidirectional communications antenna for receiving, transmitting, or both receiving and transmitting RFID data.

The microprocessor executes instructions for controlling modulation of the reader/interrogator IC, where the modulation comprises a carrier that is frequency modulated, at a rate of 10 kbps to 200 kbps, using a multi-level modulation format selected from the group consisting of direct sequence spread spectrum, frequency hopping, binary phase shift keying, and quadrature phase shift keying. The modulation further comprises a time division multiple access protocol control layer. The microprocessor comprises executable instructions for defining the non-standard protocol and the frequency used by the reader/interrogator IC and the protocol IC. Additionally, the microprocessor comprises executable instructions for lamp control, all the EPC layer functions, aggregating RFID Tag reads, formatting RFID Tag reads into a file of unique tags in a time slice for transmission over a transport link, implementing a transport layer protocol, RF multiplexing control using a hardware interface, lighting control, controlling RFID protocol to read tags, controlling RFID IC to switch antennas from reading RFID to a communications antenna, output stored tag data, implementing contingency protocols, heat monitoring, heat management, relaying messages and relaying audible announcements, with an optional speaker attached to the component housing. Alternatively, the speaker can be external to the device and receive the data using the non-standard protocol.

The instructions for implementing the non-standard communications protocol for the RFID reader, comprise the steps of: a) determining for the number of nodes, b) selecting a master node, c) sending a number of tags to be communicated and identities of the reader nodes each of node heard to a server, d) balancing polling requests, e) creating a polling table that minimizes all tag reporting, f) generating a route table for obtaining information from hidden nodes, g) collecting tag and other data by the server from the visible nodes, h) passing a master baton to each node, making each node a secondary master for one frame, i) repeating steps a) through g) for each secondary node, j) obtaining data on heard nodes from the secondary node by the master node, k) repeating steps i) and j) until all nodes are accounted for, j) creating a route table for hidden nodes, l) assigning secondary masters to request tag data from hidden nodes and communicate it back to the server, and finally m) repeating all steps a) through l) while the readers are active. Also, the microprocessor has instructions for implementing any physical layer protocol between the reader and the server. This allows the implementation of any physical layer protocol between the reader and the server/cloud. A transport layer is also is used to encapsulate data generated by the readers and used by the servers that would otherwise be transported by TCP/IP, USB, Serial, or other means specified by the reader manufacturer or the RFID Service provider. The present invention provides a 'wireless wire'—whether that wire is a USB connection, Serial (TxD/RxD etc) or TCP/IP. The microprocessor has instructions to define these various layers and implement a software defined radio communication that emulates these traditional functions, but can be modified or different protocols used in any installation at any time. This also saves time and expense from having to swap hardware encoded readers as is traditionally done. The invention future proofs the RFID readers unlike the currently available static hardware.

The power source for the RFID reader is connected to a light bulb socket connector to supply electricity for operation. Additionally, the power source reduces the voltage and amperage supplied by the light bulb socket connector, in the range of 3Vdc-14Vdc and 1 A-5 A.

The reader/interrogator IC transmits RF interrogation requests and receives RFID data from RFID tags and other RFID readers using the software defined radio defined above. When the RF integrated circuit is powered on, it is programmed to supply certain modulation to a transmitter and a receiver, and to process those signals. Thereby beginning operation as soon as power is available.

The heat removal means is configured to keep the light source attached to the internal components below 60 degrees in Celsius. The heat removal means is selected from the group consisting of a fan, a heat sink, a passive cooler, or an active cooler, and preferably, the heat removal means is a heat sink.

The light source is selected from the group consisting of incandescent, halogen, fluorescent, CFL, and one or more than one LED, and is preferably the one or more than one LED. The microprocessor has instructions for modulating the LED light source, or an infra-Red LED, for communication of RFID data and control data as an alternative non-standard protocol. The modulation is a frequency modulated carrier at rates of 10 kbps to 200 kbps.

The antenna can be a yagi antenna, such as, a dual polarized yagi, an elliptically polarized yagi, or a circular polarized yagi. Alternatively, the antenna can be a patch antenna, such as, a dual polarized patch antenna, an elliptically polarized patch antenna, or a circular polarized patch antenna. Other antenna designs can be used as long as they can be tuned to the proper frequencies to work with RFID tags and the associated readers.

DETAILED DESCRIPTION

The present invention overcomes the limitations of the prior art by providing an RFID reader with a software radio that is aesthetically pleasing and powered using existing electrical systems. The invention removes the requirement for Power over Ethernet and for a wired high speed connection from each reader to the data servers. By placing an RFID reader module inside the bulb of a lamp, and replacing the lamp (tungsten or halogen, or fluorescent) with LEDs, the new RFID reader concept can dramatically reduce the electrical power requirements of the lighting system, saving thousands of dollars per year, as well as provide RFID tag illumination anywhere there is merchandise worth lighting in visible light. Additionally, the device can be in a decorative covering that can be placed over existing bulbs.

The invention combines an RFID interrogator integrated circuit (IC), a microprocessor, a communications protocol IC and a "green" light source. These elements are fabricated to form an RFID reader with a software radio that is aesthetically pleasing 'standard bulb' that can replace regular light bulbs, floodlights, fluorescent bulbs, etc. These RFID enabled bulbs comprise the same light output and directivity of the bulbs that they replace, but comprise a built in RFID reader that can communicate RFID data over long distances wirelessly without relying on an 802.11 WiFi network. This prevents the volume of RFID data from interfering with any WiFi enabled devices in use. Additionally, the signals provided by the RFID enabled light bulbs.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Systems, methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments.

However, it will be understood by one of ordinary skill in the art that the embodiments may be practiced without these specific detail. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods and computer programs according to various embodiments disclosed. In this regard, each block in the flowchart or block diagrams can represent a module, segment, or portion of code that can comprise one or more executable instructions for implementing the specified logical function(s). It should also be noted that, in some alternative implementations, the functions noted in the blocks can occur out of the order noted in the figures. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/ or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

In the following description, certain terminology is used to describe certain features of one or more embodiments of the invention.

The term "Server" refers to one or more than one device with at least one processor configured to transmit, receive and store: instructions executable on the at least one processor; and data from either a local or remote computing device. In some instances, the local computing device can also be the server.

Various embodiments provide an RFID reader with a software radio that is aesthetically pleasing and powered using existing electrical systems. One embodiment of the present invention provides an RFID reader with a software radio that is aesthetically pleasing and powered using existing electrical systems. In another embodiment, there is provided a method for using the device. The device and method will now be disclosed in detail.

Referring now to FIG. 1, there is shown a diagram of internal components for an RFID reader with a software radio that is aesthetically pleasing and powered using existing electrical systems, according to one embodiment. The internal components comprise a reader power source 104. A reader/interrogator IC 108, a protocol IC 112, a microprocessor 106 all connected to the reader power source 104. An antenna connector 110 is connected to the reader/interrogator IC 108. A heat removal means 114 is connected to the reader power source and to a light source 806.

The reader power source 104 is connected to the light bulb socket connector 510 which supplies the electricity needed for the internal components 102 to operate. The reader power source 104 is configured to reduce the voltage and amperage supplied by the light bulb socket connector 510 to operating levels for the internal components. The voltage and amperage is reduced to a range of 3 Vdc-14 Vdc and 1 A-5 A as needed by the various internal components 102.

The reader/interrogator IC 112 transmits RF interrogation requests and receives RFID data through the antenna connector 110. Existing RFID Reader IC's are two way communications devices communicating via 'radar reflection' with a passive (no RF generating circuits) by modulating an antenna reflection coefficient. An analogy is the semaphore, or boy scout hand mirror reflecting the sun's light alternately on a target and away from the target to send 'bits' of data. In the case of boy scouts, the encoding of alphabetic letters might use International Morse code, which in addition to on-off keying, employs duration. This type of modulation is superior to plain 'on-off' keying because the '1' and '0' are encoded using different symbol lengths, and the absence of signal is used only to separate the bits, and to separate word groups.

In the case of semaphores, again each separate symbol arrives with full 'brightness' since the encoding is 'positional' not 'on-off'.

In current RFID readers, the basic 'on-off' nature of the reflection is encoded further using one of several standard digital encoding means (Manchester, Miller, FSK, PWM, etc.) Data rates from several kHz to several MHz are possible, with different (potentially orthogonal) modulation incorporated in the Transmit and Receive paths. An orthogonal modulation scheme potentially allows simultaneous (full duplex) operation on the same channel.

The RF integrated circuit (RFIC) that is the RFID reader IC is a 'software defined radio' that is programmed, on power up, to supply certain modulation (transport) means to the transmitter and the receiver, and to process those signals. An attribute of this design is that the reader IC can be repurposed to operate differently in different jurisdictional regions. Moreover, it can be repurposed from interrogating Tags and used to send tag data from the reader to a remote receiver, or to receive commands from a remote location. Transmit and Receive data rates in the reader mode range to several hundred kbps. This data rate is completely suitable to communicate data to servers or the cloud.

An advantage to repurposing the Reader IC to a communications means is the 'transmit power' which is in typically in excess of 1 Watt and is detectable over large distances, even with low or moderate performance receivers.

Mesh networks are also envisioned where certain lamps can 'relay' signals received from other lamps.

The modulation is envisioned as a carrier (e.g. 300 kHz, 600 kHz, etc.) that is frequency modulated (Frequency Shift Keying) or multi-level modulation formats (Direct Sequence Spread Spectrum, Frequency Hopping, or the like) at rates of 10 kbps to 200 kbps.

Since the total bandwidth is limited, and varies by jurisdictional region, a control layer is envisioned to allow individual readers to request access to the servers, or for that servers to query specific readers.

A simple example of such a protocol is Time Division Multiple Access (TDMA). This type of access control has been used very successfully, in GSM (Global System for Mobile) phones. An advantage of TDMA is that only one communication link is active at any one time—so the range/power control requirements are relaxed as compared to Frequency Division Multiplexing or Direct Sequence Spread Spectrum (DSSS) or Frequency Hop Spread Spectrum (FHSS) communications systems.

A TDMA system can be implemented as "mastered" or "master less". In the "mastered" system, one node acts as a control node for timing the communications for all the other nodes. In a "master less" system, an arbitration system is employed to order the nodes to specific timeslots. If there are 10 timeslots total, one is used by the master and nine are used by other nodes, as assigned by the master. The set of 10 timeslots is referred to as a TDMA "frame".

In a simple TDMA system as envisioned here, the server node would act as 'master' and broadcast, in its transmit slot, commands to the network—including instructions on what data it expects from the readers. Following the master timeslot, several timeslots are typically available before the next master timeslot. Communication occurs in a 'round robin' fashion, each node taking a turn, in a timeslot determined by the Master.

As an example—1000 readers operate in an area controlled by a server. The server (Master) timeslot is comprised of reader node addresses that are to transmit in this frame. If there are 11 response slots, it will take 100 frames to access all the reader nodes.

After operating uniformly, the master may determine that certain nodes need more timeslots per time interval to convey all the data. By allocating timeslots based on 'load' the efficiency of the communication system is maximized.

For example, assuming that each timeslot can handle 100 tags. If reader node A has 1000 tags in range, and reader nodes B, C, D, E, and F only have 100 tags in range, the server may allocate 2 timeslots to A for every allocation to B, C, D, and E. In this way, reader A gets 10 timeslots to each of one on B, C, D, E, and F. In 15 timeslots 1500 tags have been read. Without load leveling, each node gets the same number of timeslots, and collecting all 1500 tags takes 10 for A, and 10 for each of B, C, D, E, and F, which communicate the same data in each of their 10 allocations, totaling 60 timeslots. Load balancing results in a factor of 4 savings in time.

The protocol IC 108 determines the frequency and protocol that is transmitted and received by the internal components. The protocol IC 108 can be software controlled so that the protocol being used is a non-standard protocol. The non-standard protocol is used so that it will not interfere with commonly used protocols, such as, for example, WiFi.

The microprocessor 106 comprises executable instructions for defining the protocol and the frequency used by the reader/interrogator IC 112 and the protocol IC 108. This provides the ability to configure and update the internal components at any time. Additionally, the microprocessor comprises instructions to randomly or specifically alternated a set of protocols and frequencies to increase security. The microprocessor will also provide lamp control, so that powering the lights on or off, or merely dimming them can be accomplished over the same communications channel used for the RFID data. This is necessary because otherwise the readers would be shut down when the lights are turned off.

In addition to performing all the EPC layer functions, the microprocessor 106 comprises executable instructions for aggregating and formatting RFID Tag reads into a file of unique tags in a time slice for transmission over the transport link (Ethernet over AC power, Data over RF, Data over Light). Implementing the transport layer protocol (TDMA CDMA at 915 MHz or on LED or using the AC lines). RF multiplexing control using a hardware interface. Lighting control, such as, for example, on, off, dimmer, timer, mood programs (day/evening/etc.). Controlling the RFID protocol to read tags. Controlling the RFID IC to switch antennas from reading RFID to a communications antenna and to output stored tag data. Implementing contingency protocols, such as, for example, no reader activity unless network is connected, or standby mode in case of power failures. Heat monitoring and management. Relaying messages and audible announcements with an optional speaker attachment.

The antenna connector 110 is configured with the proper connection to attach to the antenna design being used in the device 500.

As will be understood by those with skill in the art with reference to this disclosure, these are examples only and not intended to be limiting.

The heat removal means 114 is configured to keep a light source 808 attached to the internal components 102 below 60 degrees in Celsius. The heat removal means can be selected from the group consisting of a fan, a heat sink, a passive cooler, or an active cooler. Preferably, the heat removal means is a heat sink.

Figure 2:
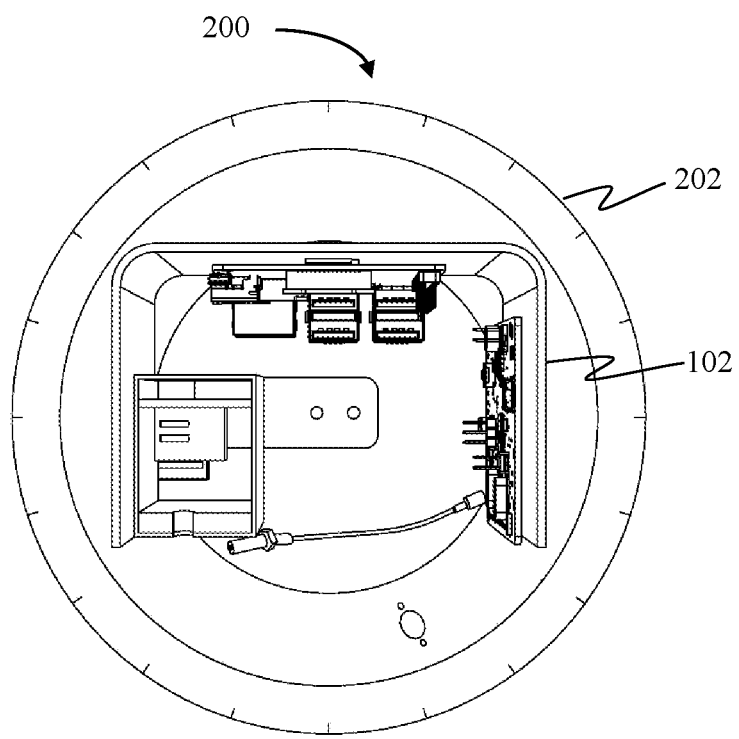
FIG. 2 is a diagram of the internal components of FIG. 7 installed in a standard light fixture.

Referring now to FIG. 2, there is shown a diagram of the internal components 102 installed in a standard light fixture. As can be seen, the internal components 102 are disposed inside a light bulb housing 202. The light bulb housing 202 can be of any standard size or shape. The internal components 102 are configured to fit inside the light bulb housing 202.

Figure 3:
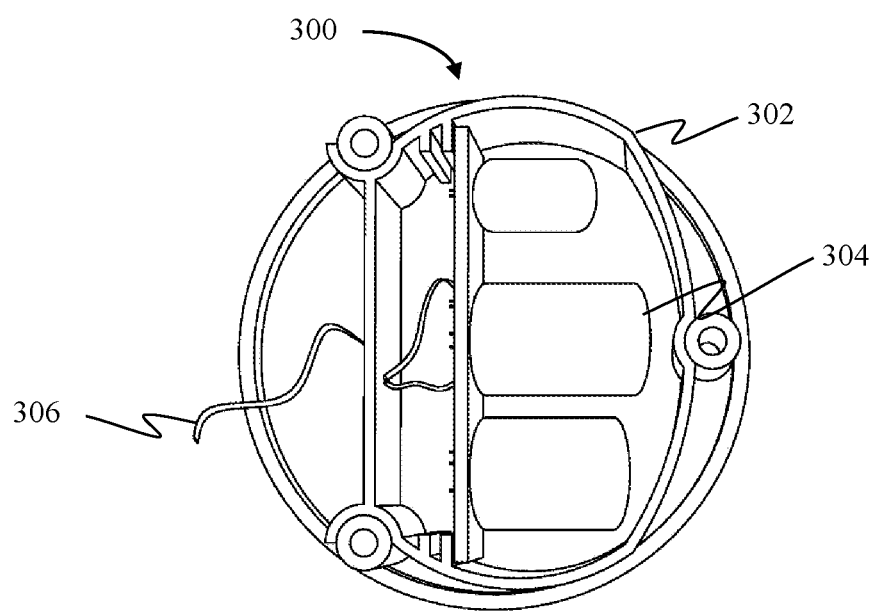
FIG. 3 is a diagram of another antenna and power source useful for the RFID reader of FIG. 1.

Referring now to FIG. 3, there is shown a diagram of another antenna and power source useful for the RFID reader of FIG. 1. In this example, the internal components 102 have been placed in a small light bulb house for a different lighting fixture. As can be appreciated, any type of lighting fixture commonly available on the mass market today can be converted into an RFID reader using the invention disclosed herein. The flexibility and cost savings for any user that requires the use of RFID tags is easily understood.

Figure 4:
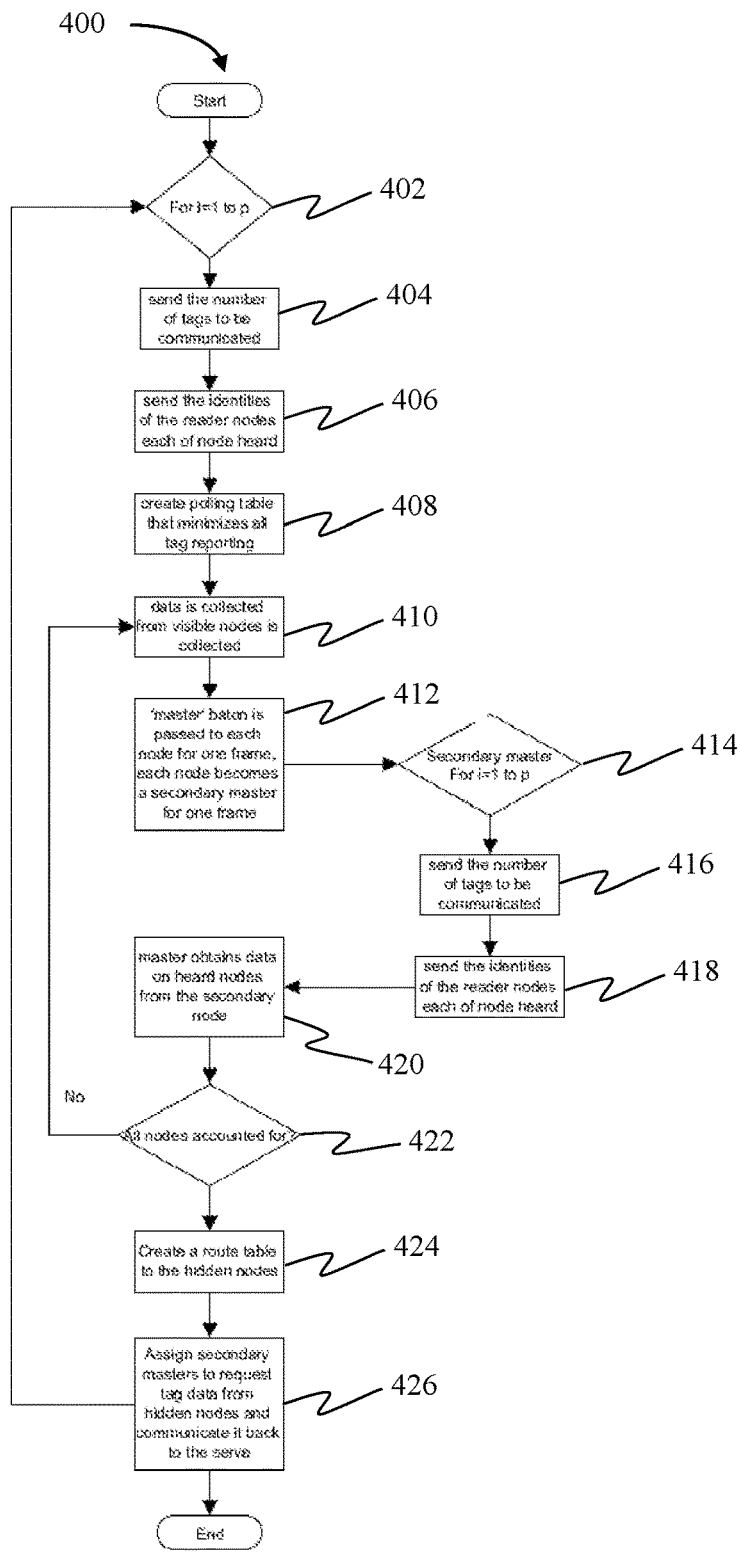
FIG. 4 is a flowchart diagram of some steps for a non-standard communications protocol for the RFID reader of FIG. 1.

Referring now to FIG. 4, there is shown a flowchart diagram 400 of some steps for a non-standard communications protocol for the RFID reader of FIG. 1, where the microprocessor comprises executable instruction for software radio control. First, for the number of nodes, where a node is a device comprising the RFID reader of FIG. 1 is determined. Then, a master node is selected. Next, a number of tags to be communicated is sent to a server along with the identities of the reader nodes each of node heard. Then, the server load balances the polling requests, creating a polling table that minimizes all tag reporting, as well as a list of any 'hidden nodes'. Hidden nodes are nodes that exist, to which the server cannot directly communicate. Next, a route table is generated for obtaining information from hidden nodes. In this example, any node not responding is assumed to be hidden. Then, using the visible nodes, tag and other data is collected by the server. The server collects data for each node, i=1 to n nodes, 1i to 10i nodes are requested to communicate, where n frames are used, and n=number of seen nodes/10. Next, a master baton is passed to one node after another, making each node a secondary master for one frame. Then, the secondary master occupies timeslot 2 and repeats the request of step above, except that the request is for i=1 to p', nodes where nodes 1i to 9i send the number of tags to be communicated and the identities of the nodes heard. Next, the master node obtains data on heard nodes from the secondary node. Then, steps 4-5 are repeated until all nodes are accounted for. Next, a route table is created for the hidden nodes. Then, secondary masters are assigned to request tag data from hidden nodes and communicate it back to the server. Finally, all steps are repeated while the readers are active.

Figure 5:
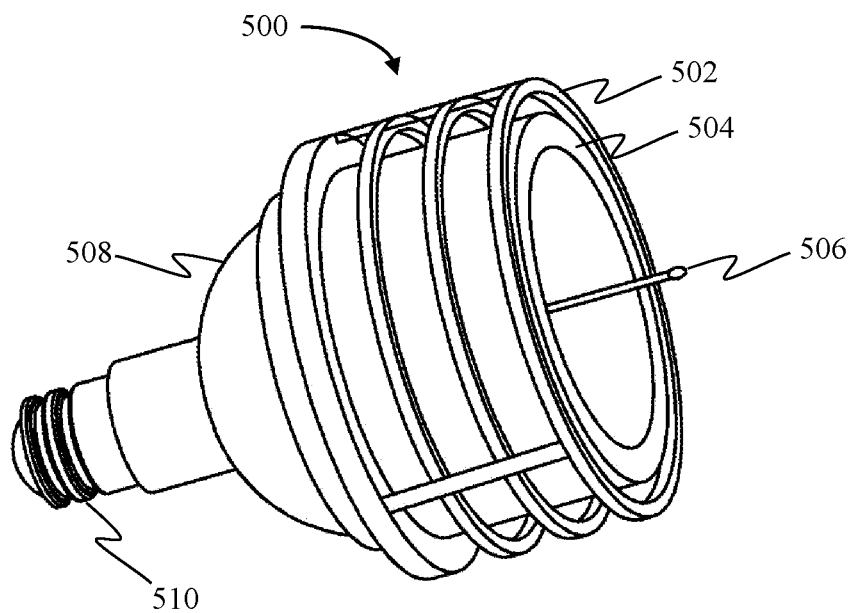
FIG. 5 is a diagram of an RFID reader with a software radio that is aesthetically pleasing and powered using existing electrical systems, according to one embodiment.

Referring now to FIG. 5, there is shown a diagram of an RFID reader 500 with a software radio that is aesthetically pleasing and powered using existing electrical systems, according to one embodiment. The RFID reader 500 comprises the RFID internal components 102 module disposed inside a light bulb housing 508. A light source (hidden beneath the decorative glass cover 504) is connected to the internal components 102. A standard lightbulb power connector 510 is connected to the internal components and to the light bulb housing 508. An RF antenna 502 is connected to the internal components 102 and the light bulb housing 508. An omnidirectional communications antenna 506 is connected to the internal components 102 for receiving RFID data.

The internal components 102 are designed to fit into whatever bulb housing that is to be used. For example, many retail stores have flood light lightbulbs throughout the retail space to illuminate products. Using the current device, some or all of the flood lights can be replaced with the present invention providing a low cost method for the retail store owner to add RFID monitoring to their inventory.

The light source can be selected from the group consisting of incandescent, halogen, fluorescent, CFL, and LED. Preferably, the light source is LEDs attached to the reader module and the power source.

The standard lightbulb power connector is known in the art and is modified to send electricity from the socket, track or whatever the normal power source for the lightbulb to the internal components 102. This allows the device 500 to be installed without any specialized wiring.

The RF antenna 502 and the omnidirectional communications antenna 506 can be of any type necessary for the installation. Antenna details are discussed below.

Additionally, the traditional lamp portion of the lightbulb, such as, for example, tungsten, halogen, or fluorescent, are normally replaced with light emitting diodes (LEDs), thereby dramatically reduce the electrical power requirements of the lighting system and saving thousands of dollars per year. Also, the device 500 provides RFID tag illumination in the vicinity where the device is used. The tag illumination is accomplished by using the RFID frequency allocation, for example, 902-928 MHz in the United States, for the data link to the server.

The device also comprises power control circuitry for control of the device including the light, so that powering the lights on or off, or dimming the lightbulb can be accomplished over the same communications channel used for the RFID data. This is necessary because otherwise the readers would be shut down when the lights are turned off.

Figure 6:
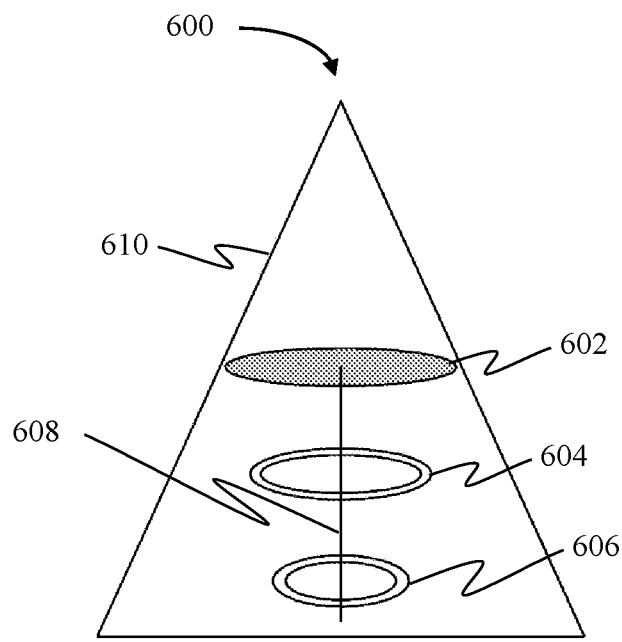
FIG. 6 is an antenna useful for the RFID reader of FIG. 1.
Figure 7:
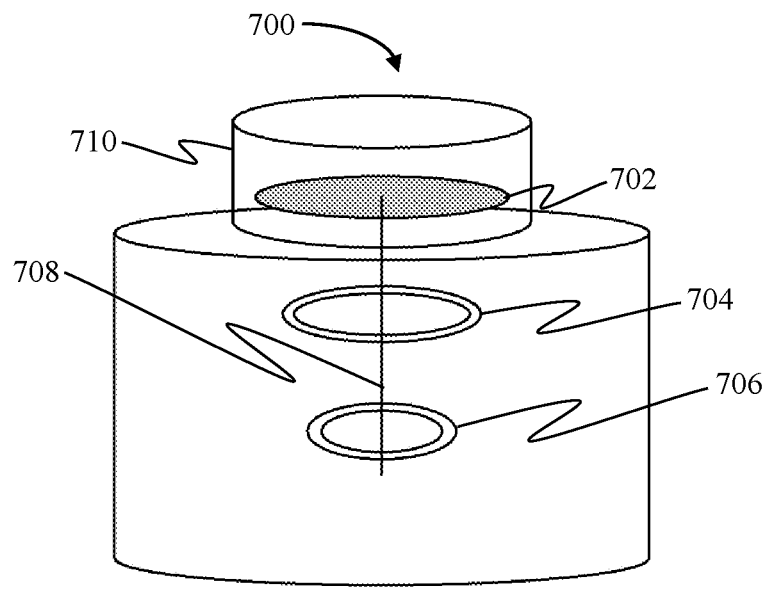
FIG. 7 is another antenna useful for the RFID reader of FIG. 1.

Referring now to FIGS. 6 and 7, there are shown antennas useful for the RFID reader of FIG. 1. As can be seen, the antennas 600 and 700 both comprise an omnidirectional antenna 608 and 708, a driven element 604 and 704 and director element 606 and 706 connected to a reflector 602 and 702 and a light source mount 610 and 710. The omnidirectional antenna 608 and 708 can be any type known in the art, but preferably it is a whip antenna to reduce costs. The omnidirectional antenna 608 and 708 is used to communicate between devices 500 and the server. The driven element 604 and 704 and the director element 606 and 706 of the antennas are electrically connected to the internal components 102 by the reflector 602 and 702. The driven element 604 and 704 transmits the RF signals and the director element 606 and 706 focuses or disperses the transmitted RF. The light source mount 610 and 710 and the reflector 602 and 702 can be connected together or be constructed to be the same element. If the light source mount 610 and 710 is not part of the reflector 602 and 702, then it will be constructed of RF transparent material as not to affect the reflectors 602 and 702 operation.

As discussed, the antenna used in the device can be selected from any available antenna design known in the art. For example, if a retailer only wanted to cover a specific area, a narrow beam antenna can be used. A spread beam antenna can be used to cover larger area. As will be understood by those with skill in the art with reference to this disclosure, various know RF antennas can be used. The examples used are not meant to be limiting on the types of antennas contemplated. These variations in antennas and coverage provides the retailer, or other user, to have security wherever there is a light source and what is best for securing tagged items. Adding additional security doesn't involve anything more than adding new light fixtures, which is far more cost effective than installation of multiple RF readers and associated cabling and other hardware. Alternatively, the antenna itself can be changed to provide different coverage using an antenna connector cable attached to both the RFID reader and the antenna to broadcast and receive RF signals. This provides even more economies for all size businesses by only needing to change the antenna and not the entire device 100.

The omnidirectional communications antenna is configured to not use standard WiFi frequencies. Using non-traditional frequencies for the device 100 to communicate information frees the normally used WiFi spectrum for typical use.

Additionally, communication can be performed using the light source itself. Modulating the LED spotlight and detecting that modulation—The light sources are intrinsically bright and the LED has fast response times. Data rates from several kHz to several MHz are possible. The modulation is envisioned as a carrier (eg 300 kHz, 600 kHz, etc.) that is frequency modulated (Frequency Shift Keying) or multi-level modulation formats (Direct Sequence Spread Spectrum, Frequency Hopping, or the like) at rates of 10 kbps to 200 kbps. The carrier would be undetectable by the human eye, but easily sensed in large open rooms by simple optical detectors. An advantage to this means is the 'transmit power' which is in typically in excess of 600 lumens and is visible over large distances, and low cost optical detectors (photo transistors, detector diodes, etc.). It is also envisioned that employing a separate optical source running lower power but much faster response times, gives rise to the ability to read tens to hundreds of readers simultaneously, by utilizing separate carrier frequencies for each light. Mesh networks are also envisioned where certain lamps can relay signals received from other lamps. Other separate optical sources, such as, Infra-Red communications is potentially an inexpensive choice because of all the IR communication means currently on the market.

In implementing this or any other physical layer protocol between the reader and the server, the transport layer is seen to be encapsulating data generated by the readers and used by the servers that would otherwise be transported by TCP/IP, USB, Serial, or other means specified by the reader manufacturer or the RFID Service provider. The present invention provides a 'wireless wire'—whether that wire is a USB connection, Serial (TxD/RxD etc) or TCP/IP.

Existing wired and wireless protocols are, for example, spelled out in IEEE 802.3 (ethernet) IEEE 802.11 (WiFi), IEEE 802.14 (Bluetooth, Zigbee, etc), and the like. Each of these protocols manage the transmission of 'datagrams' or 'data packets' between a source and a sink and can be implemented along with other known and unknown protocols. The microprocessor 106 can be configured to transmit and receive any protocol compatible with the internal components 102 by uploading new executable instructions to the microprocessor's 106 memory and storage.

Figure 8:
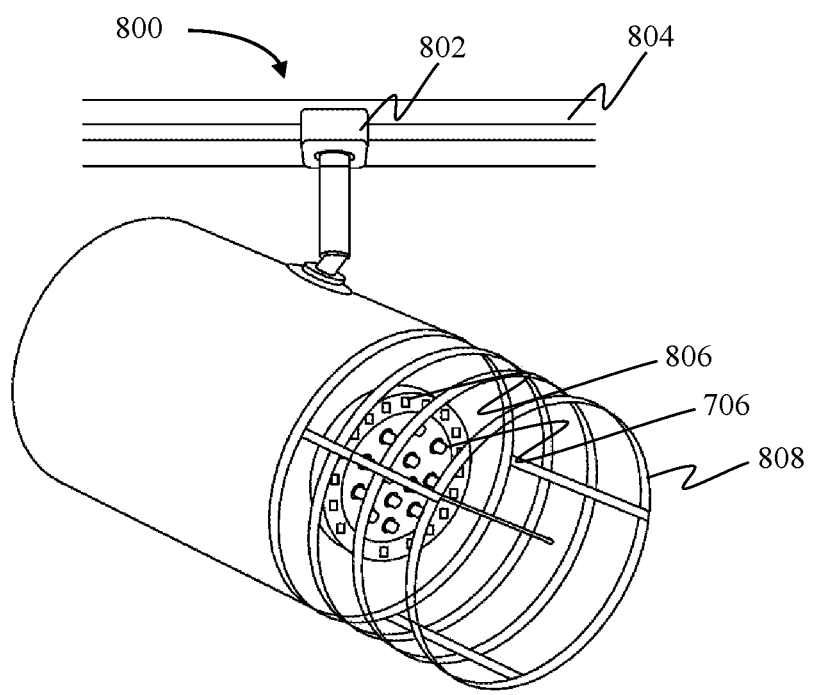
FIG. 8 is an RFID reader with a software radio that is aesthetically pleasing and powered using existing electrical systems installed on a track lighting system.

Referring now to FIG. 8 is an RFID reader 800 with a software radio that is aesthetically pleasing and powered using existing electrical systems installed on a track lighting system. As can be seen the device 800 is attached to a standard track lighting system 802. The device 800 draws all the power it requires from the track lighting system 802. The device 800 can be aimed at a specific area for both lighting from the light source and RFID coverage by the driven and director portions of the antenna. The omnidirectional antenna will receive the RFID information which is then transmitted on non-standard wireless communications channels back to a server for processing.

Very high data bandwidths from each reader device 800 back to the server can be sent over the selected protocol, or in the case of hidden nodes, to a repeater (not shown). Modulating the light source 806 with a data also provides a means to get high speed data from each of the readers to the data server, or to an optical to cable convertor.

Figure 9:
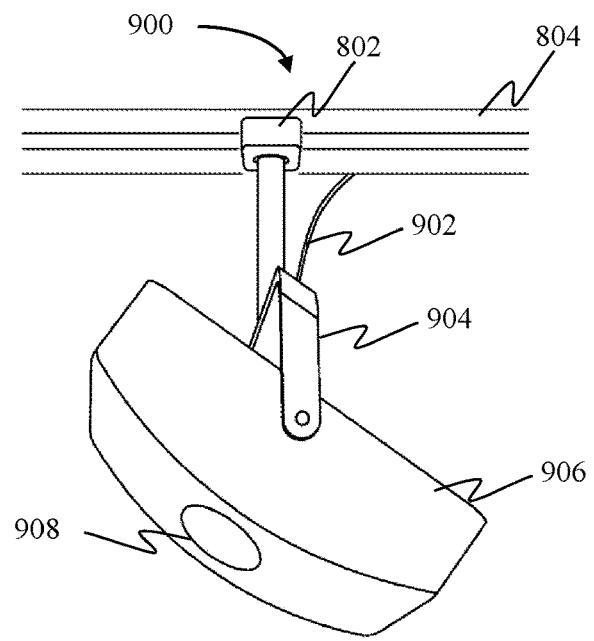
FIG. 9 is another RFID reader with a software radio that is aesthetically pleasing and powered using existing electrical systems, according to one embodiment.

Referring now to FIG. 9, there is shown another RFID reader 900 with a software radio that is aesthetically pleasing and powered using existing electrical systems, according to one embodiment. As can be seen, in this embodiment the RFID reader 900 looks like a more traditional RFID antenna commonly found. Unlike traditional RFID antennas, the RFID reader 900 comprises a light source 908, an omnidirectional antenna 902 and a connection 802 to a standard track light power source 804. This RFID reader 900 can be useful in areas where a user would like to give the impression that there is security in place by using a housing 906 that resembles the traditional RFID read. However, the RFID reader 900 can be moved anywhere along the track light power source 804 without the need to rewire the store. Also, the light source 908 can be aimed using a bracket 904 attached to the housing 906.

Figure 10:
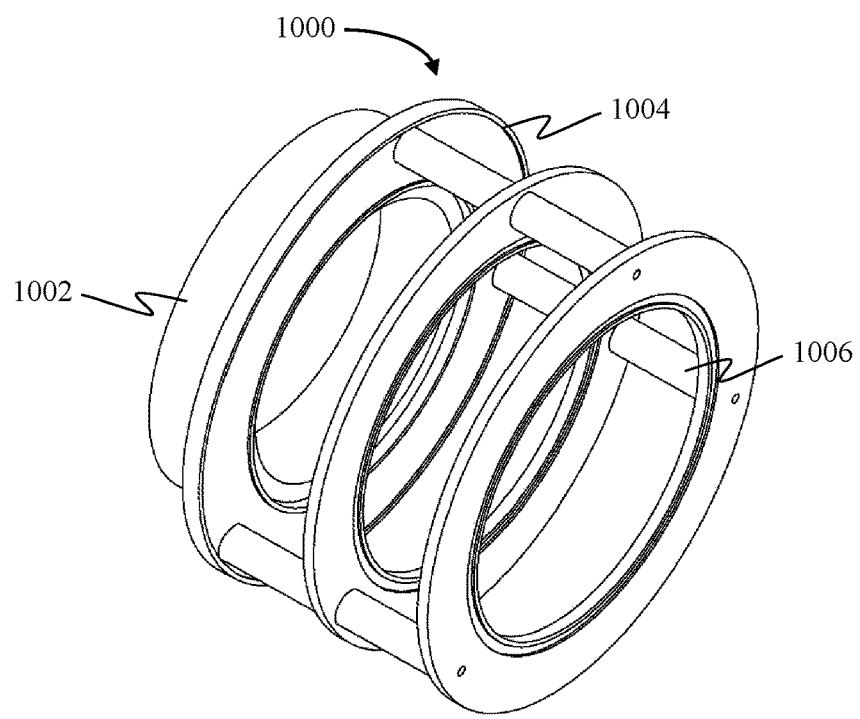
FIG. 10 is a diagram of a housing attachable to a standard light bulb that comprises an RFID reader with a software radio that is aesthetically pleasing and powered using existing electrical systems.

FIG. 10, there is shown a diagram of a decorative housing 1000 attachable to a standard light bulb that comprises an RFID reader with a software radio that is aesthetically pleasing and powered using existing electrical systems. In this embodiment, the internal components are disposed inside a base portion 1002 of the decorative housing 1000. The RF antenna 1004 and the omnidirectional antenna 1006 are also part of the decorative housing 1000. Using this configuration, the decorative housing 1000 can be attached to an existing light bulb further reducing costs by providing a means to retro-fit current light bulbs to RFID readers by attaching the decorative housing 1000 to the light bulb and connecting the decorative housing 1000 to the existing power that feeds the light bulb.

What has been described is a new and improved system for an RFID reader with a software radio that is aesthetically pleasing and powered using existing electrical systems, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. An radio frequency identification (RFID) reader, with a software defined radio, that is aesthetically pleasing and powered using existing electrical systems, the RFID reader comprising:
   a) a component housing;
   b) a microprocessor connected to the component housing, wherein the microprocessor comprises executable instructions for performing all the EPC layer functions, aggregating RFID Tag reads, formatting the RFID Tag reads into a file of unique tags in a time slice for transmission over a transport link, implementing a transport layer protocol, RF multiplexing control using a hardware interface, lighting control, controlling RFID protocol to read RFID tags, controlling RFID integrated circuit (IC) to switch antennas from reading RFID to a communications antenna, output stored RFID tag data, implementing contingency protocols, heat monitoring, heat management, relaying messages and relaying audible announcements, and wherein the microprocessor comprises instructions for implementing a non-standard communications protocol for the RFID reader, the executable instruction comprising the steps of:
  i) determining for the number of nodes; each node of the number of nodes being a device comprising the RFID reader;
  ii) selecting a master node;
  iii) sending a number of RFID tags to be communicated and identities of the RFID reader nodes each of node heard to a server;
  iv) balancing polling requests;
  v) creating a polling table that minimizes all tag reporting;
  vi) generating a route table for obtaining information from hidden nodes; the hidden nodes being nodes that exist to which the server cannot directly communicate;
  vii) collecting RFID tag and other data by the server from visible nodes;
  viii) passing a master baton to each node, making each node a secondary master for one frame;
  ix) repeating steps i) through vii) for each secondary node;
  x) obtaining data on heard nodes from the secondary node by the master node;
  xi) repeating steps ix) and x) until all nodes are accounted for;
  xii) creating a route table for the hidden nodes;
  xiii) assigning secondary masters to request tag data from the hidden nodes and communicate it back to the server; and
  xiv) repeating all steps i) through xiii) while the RFID readers are active;
c) a communications protocol IC connected to the component housing and the microprocessor using the non-standard communications protocol;
d) an RFID interrogator integrated circuit connected to the component housing and the microprocessor;
e) a power source connected to the component housing and the microprocessor;
f) a light source connected to the microprocessor;
g) a heat removal means connected to the component housing and the light source; and
h) one or more than one antenna connected to the microprocessor.

2. The RFID reader of claim 1, wherein microprocessor can relay signals received from other RFID readers.

3. The RFID reader of claim 1, wherein the microprocessor executes instructions controlling modulation of the RFID interrogator integrated circuit.

4. The RFID reader of claim 3, wherein the modulation comprises a carrier that is frequency modulated.

5. The RFID reader of claim 4, wherein the modulation comprises a carrier frequency that is a multi-level modulation format selected from the group consisting of direct sequence spread spectrum, frequency hopping, binary phase shift keying, and quadrature phase shift keying.

6. The RFID reader of claim 5, wherein the modulation comprises the carrier at a rate of 10 kbps to 200 kbps.

7. The RFID reader of claim 3, wherein the modulation further comprises a control layer.

8. The RFID reader of claim 7, wherein the control layer comprises a protocol, where the protocol is time division multiple access.

9. The RFID reader of claim 1, wherein the microprocessor comprises executable instructions for defining the RFID protocol and a frequency used by the RFID interrogator integrated circuit and the communications protocol IC.

10. The RFID reader of claim 1, wherein the microprocessor comprises executable instructions for controlling the light source.

11. The RFID reader of claim 1, wherein the microprocessor comprises executable instructions for implementing any physical layer protocol between the RFID reader and the server.

12. The RFID reader of claim 1, wherein the microprocessor comprises executable instructions for implementing the transport layer protocol to encapsulate data generated by the RFID reader and used by servers.

13. The RFID reader of claim 1, wherein the power source is connected to a light bulb socket connector of the light source to supply electricity for operation of the light source.

14. The RFID reader of claim 13, wherein the power source is configured to reduce a voltage and an amperage supplied by the light bulb socket connector.

15. The RFID reader of claim 14, wherein the voltage and amperage is reduced to a range of 3Vdc-14Vdc and 1 A-5 A.

16. The RFID reader of claim 1, wherein the RFID interrogator integrated circuit transmits RF interrogation requests and receives RFID data from the RFID tags.

17. The RFID reader of claim 1, wherein the RFID interrogator integrated circuit is the software defined radio.

18. The RFID reader of claim 1, wherein the RFID interrogator integrated circuit is programmed, on power up, to supply certain modulation to a transmitter and a receiver, and to process those signals.

19. The RFID reader of claim 1, wherein the heat removal means is configured to keep the light source attached to internal components of the RFID reader below 60 degrees in Celsius.

20. The RFID reader of claim 1, wherein the heat removal means is selected from the group consisting of a fan, a heat sink, a passive cooler, or an active cooler, and preferably, the heat removal means is a heat sink.

21. The RFID reader of claim 1 further comprising:
a) a light bulb housing connected to the component housing;
b) the light source connected to the microprocessor;
c) a standard lightbulb power connector connected to the power source;
d) one or more than one RF antenna connected to the RFID interrogator integrated circuit and the light bulb housing; and
e) an omnidirectional communications antenna connected to the RFID interrogator integrated circuit for receiving, transmitting, or both receiving and transmitting RFID data from the RFID tags.

22. The RFID reader of claim 21, wherein the light source is selected from the group consisting of incandescent, halogen, fluorescent, CFL, and one or more than one LED, and is preferably the one or more than one LED.

23. The RFID reader of claim 22, wherein the microprocessor comprises instructions for modulating the one or more than one LED of the light source for communication of RFID data and control data.

24. The RFID reader of claim 23, wherein the modulation is a frequency modulated carrier at rates of 10 kbps to 200 kbps.

25. The RFID reader of claim 21, wherein the one or more than one LED is an infra-Red LED for communication of RFID data and control data.

26. The RFID reader of claim 21, wherein the one or more than one RF antenna is a yagi antenna.

27. The RFID reader of claim 26, wherein the yagi antenna is selected from the group consisting of a dual polarized yagi, an elliptically polarized yagi, and a circular polarized yagi.

28. The RFID reader of claim 21, wherein the one or more than one RF antenna is a patch antenna.

29. The RFID reader of claim 28, wherein the patch antenna is selected from the group consisting of a dual polarized patch antenna, an elliptically polarized patch antenna, and a circular polarized patch antenna.

* * * * *